United States Patent [19]
Rim

[11] Patent Number: 6,052,768
[45] Date of Patent: Apr. 18, 2000

[54] CIRCUIT AND METHOD FOR MODULO ADDRESS GENERATION WITH REDUCED CIRCUIT AREA

[75] Inventor: Min-Joong Rim, Yongin, Rep. of Korea

[73] Assignee: Samsung Electronics, Co., Ltd., Suwon, Rep. of Korea

[21] Appl. No.: 08/921,295

[22] Filed: Aug. 29, 1997

[30] Foreign Application Priority Data

Dec. 24, 1996 [KR] Rep. of Korea .................. 96-71766

[51] Int. Cl.[7] .................................................. G06F 12/06
[52] U.S. Cl. ........................ 711/217; 711/218; 711/219; 711/220
[58] Field of Search .................. 711/217, 218, 711/219, 220, 200

[56] References Cited

U.S. PATENT DOCUMENTS

| | | | |
|---|---|---|---|
| 4,800,524 | 1/1989 | Roesgen | 711/217 |
| 4,833,602 | 5/1989 | Levy et al. | |
| 5,659,700 | 8/1997 | Chen et al. | 711/217 |
| 5,790,443 | 8/1998 | Shen et al. | 708/491 |

Primary Examiner—John W. Cabeca
Assistant Examiner—Christopher S. Chow
Attorney, Agent, or Firm—Marger Johnson & McCollom, P.C.

[57] ABSTRACT

The present invention relates to a modulo address generator and method thereof. The apparatus includes an adder which adds a current address value and an address increment value to generate an incremented address value. Also included is an adder/subtracter circuit which adds a data region size value to the incremented address value when the sign bit of the address increment value is negative and subtracts the data region size value from the incremented address value when the sign bit is positive in order to generate a revised address value. An output selection circuit selects either the incremented address value, when the sign bit is negative, or the revised address value, when the sign bit is positive, for comparison to a minimum address of the data region in order to generate a comparison result value. When the selected address value is greater than or equal to the minimum address, the comparison result value is set to a negative value and combined with the sign bit to select one of the incremented address value and the revised address value for output as the next address value.

5 Claims, 2 Drawing Sheets

6,052,768

CIRCUIT AND METHOD FOR MODULO ADDRESS GENERATION WITH REDUCED CIRCUIT AREA

BACKGROUND OF THE INVENTION

1. Field of the Invention

The present invention relates to a circuit and method for modulo address generation having reduced address generation delay and which requires less area to implement on an integrated circuit chip.

2. Description of the Prior Art

Generally, modulo addressing is used in digital signal processors (DSPs) to efficiently perform a DSP algorithm, such as a digital filter.

Modulo addressing is, in essence, a circular addressing method. The simplest type of modulo addressing returns to a base address (B) when reaching a predetermined maximum address (M) by incrementing a current address (A) by a predetermined address increment (I). The same data region is therefor repeatedly accessed. Modulo addressing can thus be implemented in a DSP algorithm to repeatedly access data that is located in a specific region, such as filter coefficient data, with high speed and a low level of address generation overhead. The address increment I can be either positive, for incrementing the address A, or negative, to decrement the address A.

In more general terms, given that a predetermined data region is defined by the maximum address M and the minimum address B, the modulo algorithm for the next address NEXT_A can be expressed as described below.

First, when $I \geq 0$ and $A+I \leq M$, then the next address NEXT_A is expressed by NEXT_A=A+I. Conversely, if $I \geq 0$ and $A+I > M$, then the next address NEXT_A is expressed as follows:

$$\text{NEXT\_A} = A + I - (M - B + 1) \qquad (1)$$

where $M \geq A \geq B$ and $I < M-B+1$.

Similarly, when $I < 0$ and $A+I \geq B$, then the next address NEXT_A is expressed as NEXT_A=A+I. However, when $I < 0$ and $A+I < B$, then the next address NEXT_A is expressed as follows:

$$\text{NEXT\_A} = A + I + (M - B + 1) \qquad (2)$$

where $M \geq A \geq B$ and $|I| < M-B+1$.

However, the implementation of equations (1) and (2) above typically requires a circuit having multiple stage adders connected in series. This has the disadvantage that the modulo address generation function may become a critical path in a high speed digital signal processor due to the delay introduced by the sequentially operating multi-stage adders. Circuits have been constructed, such as the module addressing circuit 100 shown in FIG. 1, that use high speed adders instead of multiple stage adders in order to avoid the delay introduced by multistage adders.

Modulo addressing circuit 100 consists of a first adder 11 which adds the current address A and the address increment I and outputs a resulting sum signal a. Two multiplexors (MUXs) 12 and 13 are included for selecting and outputting either the maximum address M or the minimum address B according to the sign bit, sign(I), of the address increment I. An inverter INV inverts the output from the first MUX 12 and inputs the resulting signal b to a second adder 14 which adds the output signal a of the first adder, the output signal b of the inverter and sign(I) to produce an output signal d. A third adder 15 adds the output signal d from the second adder, the output signal c from the second MUX 13 and sign(I) to produce an output signal e. XNOR gate 16 performs an exclusive NOR operation on sign(I) and the sign bit of the output signal d from adder 14, sign(d), to control the selection in MUX 17 of either the output signal a from the first adder or the output signal e from the third adder.

To understand the function of modulo addressing circuit 100, note that when $I \geq 0$ and $A+I > M$, then equation (1) above can be rewritten as follows:

$$\begin{aligned}
\text{NEXT\_A} &= A + I - (M - B + 1); \qquad (3)\\
&= A + I - M + B - 1;\\
&= A + I + (\text{inv}(M) + 1) + B - 1;\\
&= A + I + \text{inv}(M) + B
\end{aligned}$$

In equation (3), inv(M) designates a one's complement of M and $-M=\text{inv}(M)+1$, under a two's complement representation. The relation of A+I>M can therefore be expressed as $A+I+\text{inv}(M) \geq 0$. Note also that sign(I)=0 for the inputs to adders 14 and 15.

In a similar manner, when $I < 0$ and $A+I < B$, equation (2) above can be expressed as follows:

$$\begin{aligned}
\text{NEXT\_A} &= A+I+(M-B+1);\\
&= A+I+M+(\text{inv}(B)+1)+1 \qquad (4).
\end{aligned}$$

In equation (4), inv(B) designates a one's complement of B, and the equation A+I<B can be expressed as A+I+inv(B)<0.

The algorithm implemented by modulo addressing circuit 100 can then be expressed as follows:

$$a = A + I; \qquad (5)$$

$b = \text{inv}(M)$, when sign(I) = 0, or $\quad b = \text{inv}(B)$, when sign(I) is 1;

$c = B$, when sign(I) = 0, or $\quad c = M$, when sign(I) = 1;

$d = a + b + \text{sign}(I);$ $e = d + c + \text{sign}(I);$

NEXT_A = $a$, when sign(I) XNOR sign(d) = 0, or $\quad$ NEXT_A = $e$, when sign(I) XNOR sign(d) = 1.

Modulo addressing circuit 100 can be implemented as described above using only three high speed adders and some additional logic circuitry. However, the drawback of the solution illustrated by modulo addressing circuit 100 is the increased chip area required to construct the three high speed adders 11, 14 and 15.

SUMMARY OF THE INVENTION

It is an object of the present invention to provide a modulo address generator and method which requires less chip area to implement and has reduced circuit delay.

An embodiment of the modulo address generator of the present invention includes an adder which receives and adds a current address value and an address increment value in order to generate an incremented address value. The generator also includes an adder/subtracter circuit which receives the incremented address value, a data region size value, which corresponds to a data region to be addressed, and a sign bit of the address increment value, where the adder/subtracter circuit adds the data region size value to the incremented address value when the sign bit is a negative value and subtracts the data region size value from the incremented address value responsive when the sign bit is a positive value in order to generate a revised address value. An output selection circuit then receives the incremented address value, the data region size value and the sign bit, and selects the incremented address value for a next address value when the sign bit is positive and the revised address value is less than a minimum address value of the data region, selects the revised address value for the next address value when the sign bit is positive and the revised address value is one of greater than or equal to the minimum address value of the data region, selects the revised address value for the next address when the sign bit is negative and the incremented address value is less than the minimum address value of the data region, and selects the incremented address value for the next address when the sign bit is negative and the incremented address value is greater than or equal to the minimum address value of the data region.

An embodiment of a method for modulo address generation according to the present invention includes adding an address increment value and a current address value to produce an incremented address value. The method also includes adding a data region size value, corresponding to a data region, to the incremented address value to produce a revised address value when a sign bit of the address increment value is a negative value and subtracting the data region size value from the incremented address value to produce the revised address value when the sign bit of the address increment value is a positive value. The method further includes selecting the incremented address value for a comparison value when the sign bit is the negative value and selecting the revised address value for the comparison value when the sign bit is the positive value. The method then involves comparing the comparison value to a minimum address value of the data region to produce a comparison result value. Then the comparison result value and the sign bit are combined to produce a selection value and either the incremented address value or the revised address value is selected for a next address value according to the selection value.

BRIEF DESCRIPTION OF THE DRAWINGS

The above objects and advantages of the present invention will become more apparent by describing in detail a preferred embodiment thereof with reference to the attached drawings in which.

DETAILED DESCRIPTION OF PREFERRED EMBODIMENT

Figure 1:
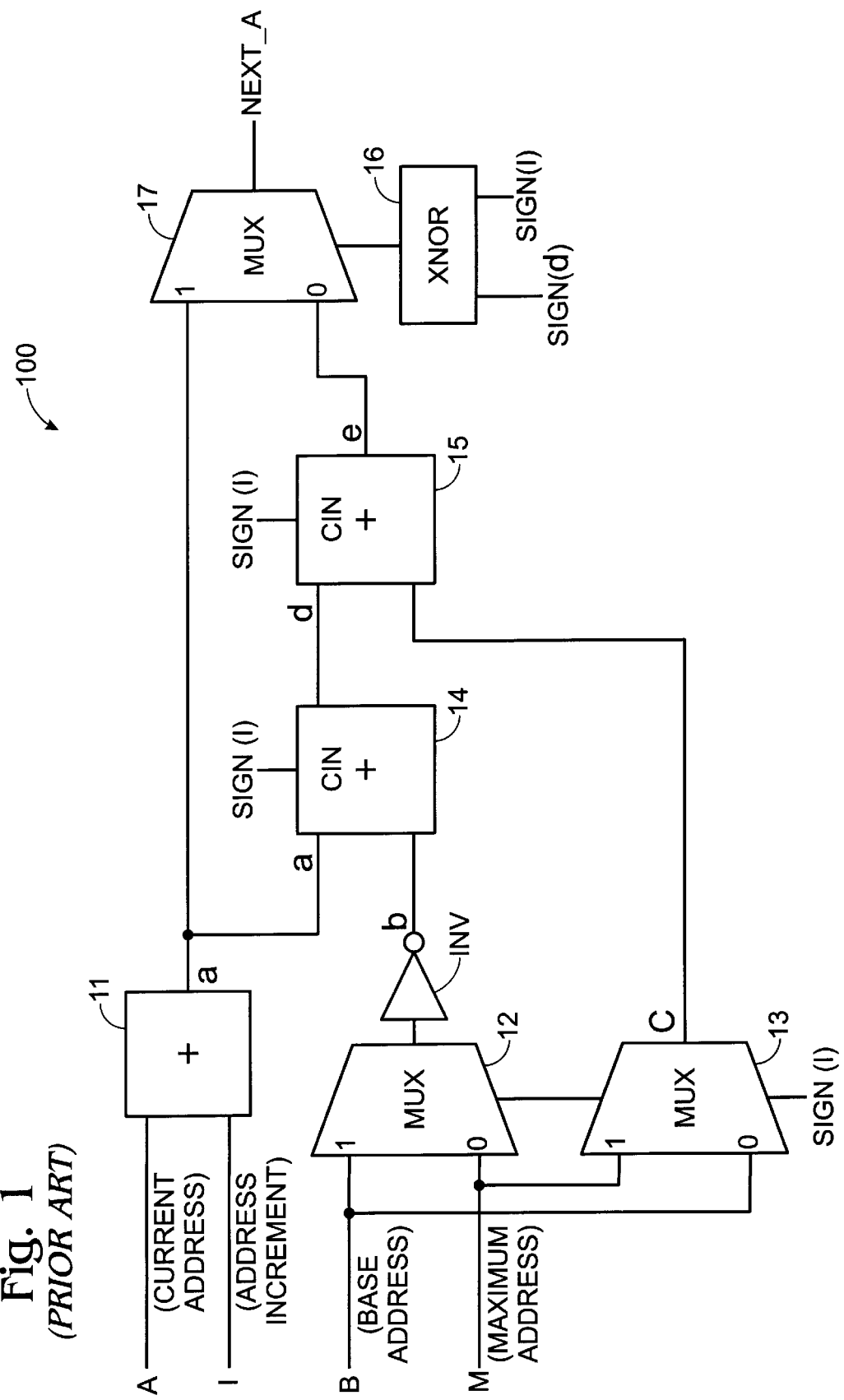
FIG. 1 is a block diagram of a conventional modulo address generator.
Figure 2:
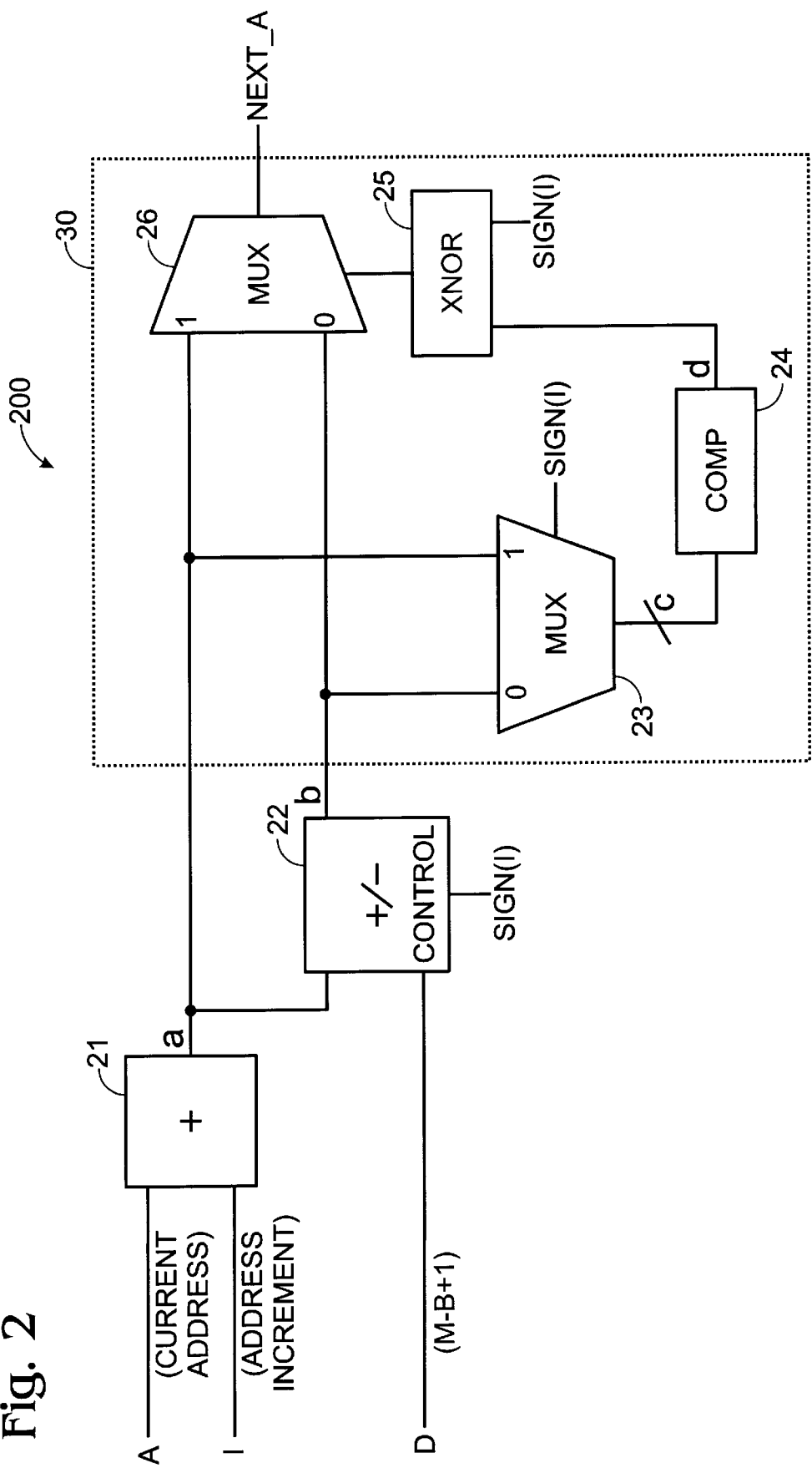
FIG. 2 is a block diagram of a modulo address generator according to the present invention.

FIG. 2 is a block diagram of a modulo address generator circuit 200 according to the present invention. As shown in the drawing, modulo address generator 200 includes an adder 21 which receives the current address A and the address increment I, adds A and I, and generates an output signal a. An adder/subtracter circuit 22 is provided to add or subtract a value D, where D=M−B+1 and represents the size of the data region being addressed, from the output value a from adder 21 under control of the sign bit value sign(I) of the address increment I in order to generate an output signal b. An output selecting circuit 30 selects either the output signal a from adder 21 or the output signal b from adder/subtracter circuit 22. If sign(I)=0 and the value of output signal b from adder/subtracter circuit 22 is greater than or equal to minimum address value B of the data region (A+I−D≧B), then the output signal b from adder/subtracter circuit 22 is selected as the next address value NEXT_A. Else, output signal a is selected for output as NEXT_A. If sign(I)=1 and the value of output signal a from adder 21 is less than minimum address value B (A+I<B), then output signal b from adder/subtracter circuit 22 is selected for output as NEXT_A. Else, output signal b is selected as the next address value NEXT_A.

Output selecting circuit 30 consists of a first MUX 23 which selects, under control of sign(I), either the output value a from adder 21 or the output value b from adder/subtracter circuit 22 for input to comparator 24 for comparison to the minimum address value B. Output signal d from comparator 24 is input to XNOR gate 25 where the value of output signal d is combined with the sign value sign(I) to generate selection signal e which is input to MUX 26 to control the selection of either output signal a from adder 21 or output signal b from adder/subtracter 22 for output as the next address value NEXT_A.

When I≧0 and A+I−D<B, then NEXT_A=A+I=a. When I≧0 and A+I−D≧B, however, then equation (1) above can be expressed as follows for use in modulo address generator circuit 200 above:

$$NEXT\_A = A+I-D, \text{ where } D=M-B+1 \qquad (6).$$

Similarly, when I<0 and A+I≧B, then NEXT_A=A+I=a. When I<0 and A+I<B, however, then equation (2) above can be expressed as follows:

$$NEXT\_A = A+I+D \qquad (7).$$

The relations above can be stated in terms of output value a from adder 21, output value b from adder/subtracter circuit 22, output value c from MUX 23, output value d from comparator 24, and output value from XNOR gate 25 as follows:

$$a = A + I; \qquad (8)$$

$$b = a - D = A + I - (M - B + 1), \text{ when sign}(I) = 0; \text{ or}$$

$$b = a + D = A + I + (M - B + 1), \text{ when sign}(I) = 1;$$

$$c = b = A + I - D, \text{ when sign}(I) = 0; \text{ or}$$

$$c = a = A + I, \text{ when sign}(I) = 1;$$

$$d = 1, \text{ when } B \le c, \text{ where } c = A + I - D, \text{ when}$$

$$\text{sign}(I) = 0, \text{ and } c = A + I, \text{ when}$$

$$\text{sign}(I) = 1; \text{ or}$$

$$d = 0, \text{ when } B > c; \text{ and}$$

$$NEXT\_A = a, \text{ when } e = 1;$$

$$NEXT\_A = b, \text{ when } e = 0.$$

As described above, a modulo address generator, according to the present invention, can be constructed using two high speed adders and a comparator, thus decreasing the chip area required to implement the present invention in an integrated circuit. In addition, the modulo address generator and method according to the present invention reduces the delay time for the modulo address generation operation by reducing the number of adding operations. Accordingly, the present invention is well suited for application to high speed digital signal processing.

What is claimed is:

1. A modulo address generator comprising:

an adder configured to receive a current address value and an address increment value and add the address increment value to the current address value in order to generate an incremented address value;

an adder/subtracter circuit configured to receive the incremented address value, a data region size value corresponding to a data region and a sign bit of the address increment value, wherein the adder/subtracter circuit is further configured to add the data region size value to the incremented address value responsive to negative value of the sign bit and subtract the data region size value from the incremented address value responsive to a positive value of the sign bit in order to generate a revised address value; and an output selection circuit configured to receive the incremented address value, the data region size value and the sign bit, wherein the output selection circuit is further configured to select the incremented address value for a next address value responsive to the positive value of the sign bit and the revised address value being less than a minimum address value of the data region, select the revised address value for the next address value responsive to the positive value of the sign bit and the revised address value being one of greater than or equal to the minimum address value of the data region, select the revised address value for the next address responsive to the negative value of the sign bit and the incremented address value being less than the minimum address value of the data region, and select the incremented address value for the next address responsive to the negative value of the sign bit and the incremented address value being one of greater than or equal to the minimum address value of the data region.

2. The modulo address generator of claim 1, wherein the output selecting means further comprises:

a first multiplexor configured to receive the incremented address value and the revised address value, select the incremented address value for a comparison value responsive to the negative value of the sign bit and select the revised address value for the comparison value responsive to the positive value of the sign bit;

a comparator configured to receive the comparison value and compare the comparison value to the minimum address value in order to generate a comparison result value, wherein the comparison result value is a negative value when the comparison value is one of greater than and equal to the minimum address value and the comparison result value is a positive value when the comparison value is less than the minimum address value;

an exclusive NOR circuit configured to receive and combine the comparison result value and the sign bit in order to generate a selection signal; and a second multiplexor configured to receive the incremented address value, the revised address value, and the selection signal and select the incremented address value for the next address value responsive to a positive value of the selection signal and select the revised address value for the next address value responsive to a negative value of the selection signal.

3. The modulo address generator circuit of claim 2, wherein the adder further comprises a high speed adder and wherein the adder/subtracter circuit further comprises a high speed adder/subtracter.

4. A modulo address generating method comprising steps for:

adding an address increment value and a current address value to produce an incremented address value;

adding a data region size value, corresponding to a data region, to the incremented address value to produce a revised address value when a sign bit of the address increment value is a negative value;

subtracting the data region size value from the incremented address value to produce the revised address value when the sign bit of the address increment value is a positive value;

selecting the incremented address value for a comparison value when the sign bit is the negative value;

selecting the revised address value for the comparison value when the sign bit is the positive value;

comparing the comparison value to a minimum address value of the data region to produce a comparison result value;

combining the comparison result value and the sign bit to produce a selection value; and selecting one of the incremented address value and the revised address value for a next address value according to the selection value.

5. The method of claim 4, wherein:

the step of comparing the comparison value to a minimum address value includes:
    setting the comparison result value to a negative value when the comparison value is one of greater than and equal to the minimum address value, and
    setting the comparison result value to a positive value when the comparison value is less than the minimum address value;

the step of combining the comparison result value and the sign bit includes:
    exclusive-NORing the comparison result value and the sign bit to produce the selection value; and the step of selecting one of the incremented address value and the revised address value includes:
    selecting the incremented address value for the next address value when the selection value is the negative value, and
    selecting the revised address value for the next address value when the selection value is the positive value.

* * * * *

UNITED STATES PATENT AND TRADEMARK OFFICE
CERTIFICATE OF CORRECTION

PATENT NO. : 6,052,768
DATED : April 18, 2000
INVENTOR(S) : Min-Joong Rim

It is certified that error appears in the above-identified patent and that said Letters Patent is hereby corrected as shown below:

Column 1,
Line 55, "module" should read -- modulo --.

Column 5,
Line 56, "greater than and equal to" should read -- greater than or equal to --.

Column 6,
Line 44, "greater than and equal to" should read -- greater than or equal to --.

Signed and Sealed this

Third Day of December, 2002

JAMES E. ROGAN
*Director of the United States Patent and Trademark Office*